(12) United States Patent
De Natale et al.

(10) Patent No.: US 8,379,737 B2
(45) Date of Patent: Feb. 19, 2013

(54) INTERFACE MODULE FOR COMMUNICATION WITH AN ELECTRONIC OR AN ELECTROMECHANICAL DEVICE OF A MEDIUM VOLTAGE INTERRUPTION UNIT

(75) Inventors: Gabriele Valentino De Natale, Milan (IT); Fabio Mannino, Curno (IT)

(73) Assignee: ABB Technology AG, Zurich (CH)

( * ) Notice: Subject to any disclaimer, the term of this patent is extended or adjusted under 35 U.S.C. 154(b) by 779 days.

(21) Appl. No.: 12/511,635

(22) Filed: Jul. 29, 2009

(65) Prior Publication Data

US 2010/0027687 A1 Feb. 4, 2010

(30) Foreign Application Priority Data

Jul. 31, 2008 (EP) .................................. 08161600

(51) Int. Cl.
*H04L 27/00* (2006.01)
(52) U.S. Cl. ........................................ 375/259
(58) Field of Classification Search .................. 375/259
See application file for complete search history.

(56) References Cited

U.S. PATENT DOCUMENTS 5,495,503 A 2/1996 King et al.

FOREIGN PATENT DOCUMENTS

| DE | 19736181 A1 | | 2/1999 |
| DE | 10031964 | * | 2/2002 |
| DE | 10031964 C1 | | 2/2002 |
| EP | 1487077 | * | 12/2004 |
| EP | 1487077 A2 | | 12/2004 |
| EP | 1585230 | * | 10/2005 |
| EP | 1585230 A1 | | 10/2005 |
| FR | 2799572 A1 | | 4/2001 |

OTHER PUBLICATIONS

Extended Search Report issued in counterpart European Application No. 08161600.5.

* cited by examiner

*Primary Examiner* — David C. Payne
*Assistant Examiner* — Brian J Stevens
(74) *Attorney, Agent, or Firm* — Connolly Bove Lodge & Hutz LLP

(57) ABSTRACT

An interface module for communication with at least a first electronic or electromechanical device of a medium voltage interruption unit which comprises at least a power supply port through which the first device receives electric power. The interface module further comprises first interface means that are electrically connected to the power supply port, the first interface means exchanging information with the first device through the power supply port.

18 Claims, 1 Drawing Sheet

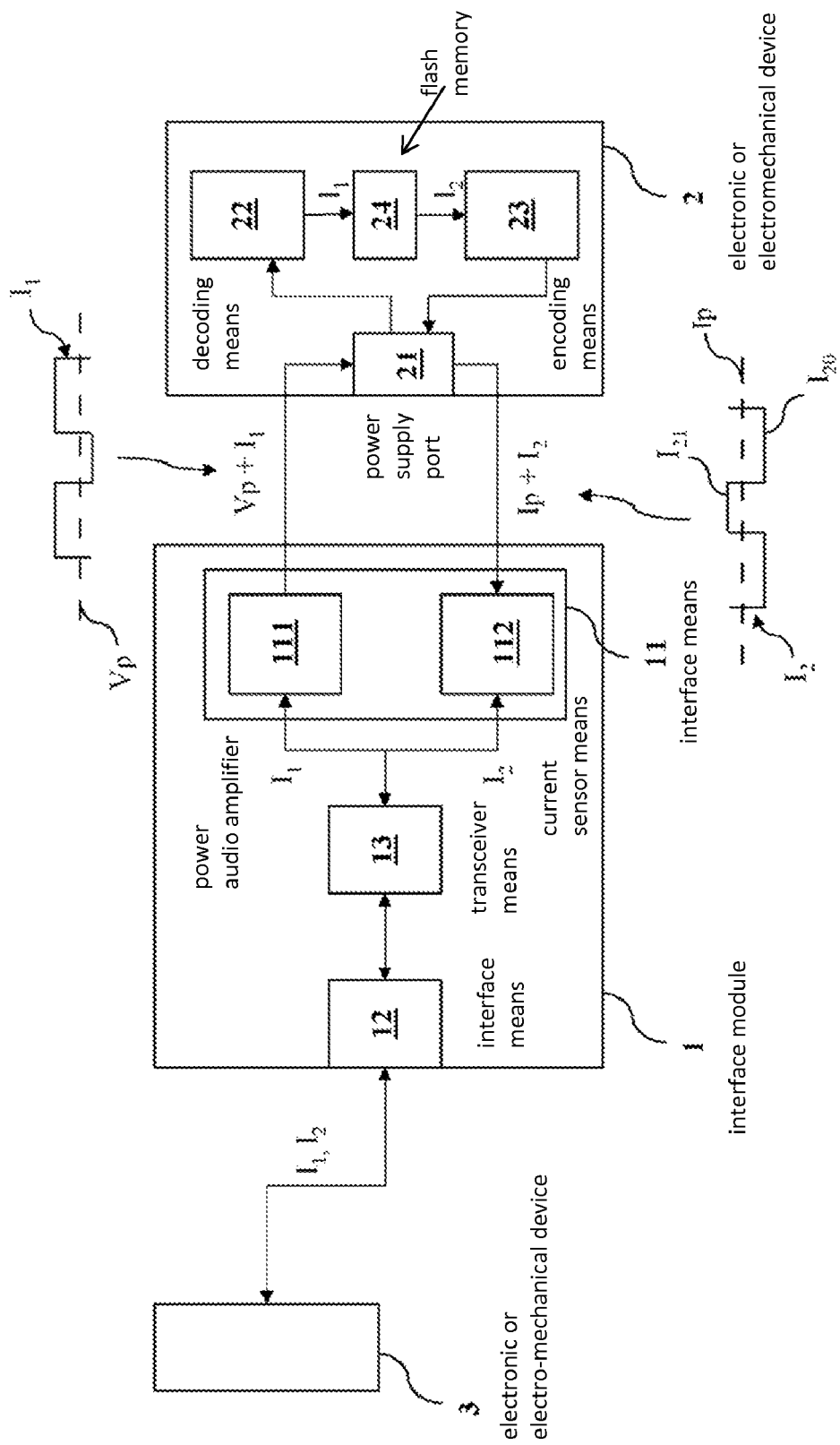

INTERFACE MODULE FOR COMMUNICATION WITH AN ELECTRONIC OR AN ELECTROMECHANICAL DEVICE OF A MEDIUM VOLTAGE INTERRUPTION UNIT

CROSS REFERENCE TO RELATED APPLICATIONS

This application claims priority to EP 08 161 600.5 filed Jul. 31, 2008, the entire contents is hereby incorporated by reference.

The present invention refers to an interface module for communication with an electronic or an electromechanical device of a medium voltage interruption unit.

As is widely known, an interruption unit (such as for example a circuit breaker, a disconnector or the like) for medium voltage applications (i.e. for voltage values higher than 1 kV) is a quite complex system that may comprise a variety of electronic or electromechanical devices, which generally consist of actuating devices, sensing devices, relays, switch devices, locking devices or the like.

Said devices may be installed in a large number of variants, each of said variants being selected depending on the typology of the interruption unit. For example, in a medium voltage circuit breaker more than thirty possible variants of coil switches may be selected depending on the market/installation requirements.

The operational settings of said electronic or electromechanical devices have to be properly configured or programmed, according to the needs. This usually requires a considerable amount of labor, since a different communication/programming mode has to be adopted for each different device typology.

The characteristic parameters (e.g. the maximum operating voltage) of each kind of said electronic or electromechanical devices are now actually set with reference to the maximum values that are allowed by regulations or incidental market/installation constraints. This fact may entail a waste of material and increase manufacturing costs.

Moreover, common interruption unit manufacturing procedures foresee that the electronic or electromechanical devices to be installed have to be properly numbered and provided with identification tags, which need to be retrieved many times during the assembly of the interruption unit. Nowadays, these identification procedures entail a considerable waste of time and labor.

The drawbacks just described may be levied by adopting serial communication interfaces that are already present in the market. Unfortunately, these interface devices are quite expensive and their use entails a remarkable increase of the overall manufacturing costs, which is quite often not acceptable in relation to the target costs that are commonly considered for the manufacturing activities of interruption units.

The installation of these interface devices on interruption units that are already on the field is rather difficult, since modifications on said interruption units are required, such as the arrangement of additional cabling.

From the considerations above, it is apparent how there still is a continuing need of low cost communication solutions, which allow to obtain an easy and effective exchange of information, more effective programming and identification procedures and a reduction of the number of necessary variants in relation to the electronic and electromechanical devices of a medium voltage interruption unit.

Thus, the main technical aim of the present invention is to provide an interface module for communication with one or more electronic or electromechanical devices of a medium voltage interruption unit, which allows the overcoming of the above-described drawbacks and the satisfaction of this largely felt need.

As part of said aim, it is an object of the present invention to provide an interface module, which allows an easy exchange of information with one or more electronic or electro-mechanical devices of said medium voltage interruption unit.

A further object of the present invention is to provide an interface module, which allows an easy programming of one or more electronic or electromechanical devices of said medium voltage interruption unit.

A further object of the present invention is to provide an interface module, which allows an easy retrieval of information from one or more electronic or electromechanical device of said medium voltage interruption unit.

A further object of the present invention is to provide an interface module, which allows an easy transmission of information to one or more electronic or electromechanical devices of said medium voltage interruption unit.

Finally, it is an object of the present invention to realize an interface module, which allows the improvement of the assembly procedures of said interruption unit and which is easy to implement and at competitive costs.

This aim and these objects are achieved, according to the invention, by an interface module, according to the following claim 1.

In its more general definition, the interface module, according to the invention, comprises first interface means that are electrically connected with a power supply port of one or more electronic or electromechanical devices of said medium voltage interruption unit, said first interface means exchanging information with said electronic or electromechanical devices through said power supply port.

BRIEF DESCRIPTION OF THE DRAWING

FIG. 1 illustrates a module for communication.

As it will more apparent in the following, the interface module, according to the invention, allows an easy and quick exchange of information with said electronic or electro-mechanical devices and the adoption of easier programming and identification procedures. Said procedures may be executed substantially independently from the typology of the electronic or electromechanical devices connected to the interface module.

The adoption of easier programming procedures allows to dramatically reduce the overall number of variants that are necessary to cover the installation/market requirements.

The adoption of easier programming procedures further allows to improve the configuration of the operational settings of said electronic or electromechanical devices, with consequent reduction of the amount of waste materials.

Further characteristics and advantages of the present invention will become easier to understand with reference to the description provided below and to the attached FIG. 1 that is provided for illustrative and non-limitative purposes, in which it is shown a schematic view of an arrangement of a medium voltage interruption unit, which comprises the interface module, according to the present invention.

With reference to the above-mentioned FIG. 1, the present invention refers to an interface module 1 for communication with at least a first electronic or electromechanical device 2 of a medium voltage interruption unit (not shown).

The first device 2 may consist of an actuating device, a sensing device, a relay, a switch device, a locking device or another similar electronic or electromechanical arrangement.

The medium voltage interruption unit may be a medium voltage circuit breaker, or disconnector or the like.

The first device 2 comprises at least a power supply port 21, through which electric power is delivered to it.

The interface module 1 comprises first interface means 11 that are electrically connected to the power supply port 21 and that are capable of exchanging information I1, I2 with the first device 2 through said power supply port 21.

With the term "exchanging information", it is intended that the first interface means 11 may transmit information I1 to the first device 2 or receive information I2 from it, and viceversa.

The content of the pieces of information I1, I2 may be any according to the needs, such as, for example, operational parameters and data, setting or configuration parameters, data related to the operation of the interruption unit, identification tags or numbers, command or triggering signals, and the like.

The interface module 1 is also connected with at least a second electronic or electro-mechanical device 3.

In principle the second device 3 may be any electronic or electromechanical device that has to exchange information with the first device 2. As it will be seen better in the example described in the following, the second device 3 may consists of a computerized unit for programming/configuring the first device 2.

In order to communicate with the second device 3, the interface module 1 preferably comprises second interface means 12, which are capable of exchanging information with the second device 3. Advantageously, the second interface means 12 comprise one or more RS232 or USB communication ports.

Preferably, the interface module 1 comprises transceiver means 13, which allows the exchange of information between the first and second interface means 11 and 12. Preferably, the transceiver means 13 consist of a RS232 transceiver or a RS232/USB transceiver or the like.

The interface module 1 may also comprise one or more microcontrollers (not shown).

In a preferred embodiment of the present invention, the first interface means 11 transmit information I1 to the first device 2 by properly modulating the supply voltage, which is supplied to the first device 2 through the power supply port 21.

As is shown in FIG. 1, the modulation of the supply voltage may occur by superimposing the data signal I1 to the voltage level Vp that is normally supplied to the first device 2.

To this aim, the first interface means 11 comprise a power audio amplifier 111 for modulating the supply voltage on the base of the information I1 to be transmitted to the first device 2.

Thanks to the amplifier 111, the first interface means 11 provide a modulated supply voltage signal Vp+I1 on the base the digital information coming from the second device 3.

The first device preferably comprises first decoding means 22, which receive the modulated supply voltage signal Vp+I1 from the power supply port 21 and decode the information I1 from said modulated signal Vp+I1.

The first decoding means 22 preferably consist of one or more software programs or procedures or modules that are executed by a control unit (not shown) in the first device 2.

The information I1 so decoded by the decoding means 22 may be stored in storage means 24, preferably consisting of a flash memory.

Preferably, the first device 2 transmits information I2 to the first interface means 11 by modulating the power supply current value Ip, which is normally received by the first device 2 through the power supply port 21.

In order to transmit the information I2 the first device 2 executes a modulation of its current consumption on the base of the information I2 to be transmitted.

To this aim, the first device comprises advantageously encoding means 23 for encoding the information I2.

More particularly, the encoding means 23 convert the digital information I2 to be transmitted (which may be present in the storage means 24) in a sequence of different current levels I20, I20 . . . I2N, which are taken as supply current levels by the first device 2. The supply levels I20 . . . I2N are taken around the supply current Ip, which is normally received by the first device 2. In the embodiment of the present invention shown in FIG. 1, only two current levels I20, I21 have been adopted by the encoding means 23.

Preferably, also the second encoding means 23 consist of one or more software programs or procedures or modules that are executed by a control unit (not shown) in the first device 2.

In order to retrieve the information I2 transmitted by the first device 2, the first interface means need to measure the supply current levels I20, I21 . . . I2N that are imposed by the encoding means 23.

To this aim, the first interface means 11 advantageously comprise current sensor means 112 for measuring the power supply current, which is consumed by the first device 2. The current sensor means 112 thus allow to identify the sequence of current supply levels that are consumed by the first device 2 and consequently the information I2, on the base of which said sequence is structured.

The current sensor means 112 may comprise, for example, a Hall current sensor or a shunt resistor.

The operation of the interface module 1, according to the invention, is now described with specific reference to a case, in which the first device 2 consist of an electromagnetic switch device, for example a so-called "coil switch", and in which the second device 3 is a personal computer.

It is nonetheless intended that the interface module, according to the invention, may be used for communication with any kind of electronic or electro-mechanic device of the interruption unit.

As mentioned above, the interface module 1 may be used for transmitting information I1 to the switch device 2.

The information I1 to be transmitted to the switch device 2 (and stored therein) is sent by the personal computer 3 to the port 12. The transceiver means 13 provide the amplifier 111 with the information I1. The amplifier 111 modulates the supply voltage of the switch device 2 on the base of the information I1. The modulated supply voltage signal Vp+I1 is then provided to the switch device 2 through the power supply port 21 and it is then decoded by the decoding means 22. The information I1 so obtained is stored in the flash memory 24.

The interface module 1 may be also used to retrieve I2 from the switch device 2.

The switch device 2 receives a retrieval command from the interface module 1 or the personal computer 3 through the port 21.

The information I2 to be retrieved from the switch device 2 is read from the flash memory 24 and is used by the encoding means 23 to define a sequence of supply current levels I20, I21 . . . I2N for the supply current that is consumed by the switch device 2 through the power supply port 21. Said sequence of current levels is measured by the current sensor means 112, which are thus capable of obtaining the information I2 therefrom. Information I2 is then provided to the port 12 by the transceiver means 13 and is then sent to the personal computer 3.

In the example described above, the following advantages are achieved thanks to the presence of the interface module 1, according to the invention:
- identification information, such as the serial number, of the switch device 2 may be easily stored in the flash memory 24; and
- said identification information may be easily retrieved during the assembly of the interruption unit; and
- operational parameters of the switch device 2 may be easily stored in the flash memory 24 and automatically modified according to the needs; and
- less powerful microcontrollers may be used for the switch device 2

From the description above, it emerges that the interface module 1 has to know the voltage and current values Vp, Ip that are normally supplied to the first device 2.

These values may be predefined and stored in the interface module 1.

Unfortunately, these values are not constant and may depend on the physical characteristics and installation conditions of the first device 2.

For example, these values may depend on the length of the installed cables or on structural differences that emerge during the manufacturing process of the first device 2. Further, they may change depending on the typology of the first device 2.

For this reason, the interface module 1, according to the present invention, is preferably capable of executing a self learning procedure in order to establish the supply voltage and current values Ip and Vp that are actually supplied to the first device 2 in normal conditions.

Said self learning procedure has the advantage of making more reliable the exchange of information with the first device 2, since it provides the actual values Ip and Vp that have to be modulated for communicating with the first device 2 through the supply port 21.

Said self learning procedure may include a step of measuring (thanks to the sensor means 112) the supply current at the starting up of the first device 2. Since at the start-up the first device 2 is certainly able to operate also at supply voltage values lower than Vp, the measured current will be lower than Ip and may be expressed as Ilow=Ip−ΔI1.

The self learning procedure foresees a step of increasing the supply voltage of the first device 2, for example thanks to the application of a voltage ramp by means of the amplifier 111.

The self learning procedure provides also a step of checking the supply current to the first device 2 during the increase of the supply voltage.

Then, the self learning procedure provides a step of memorizing the supply voltage value, at which an increase to a value of the supply current is noticed. This memorized value is the voltage value Vp that is supplied to the first device 2 in normal conditions.

The self learning procedure then provides a further step of measuring the increased current supplied to the first device, which in this case will be higher than Ip and may be expressed as Ihigh=Ip+ΔI2.

Finally, the self learning procedure comprises the step of calculating the value Ip=(Ihigh+Ilow)/2 of the current that is actually supplied to the first device 2 in normal conditions.

In practice, it has been demonstrated that the interface module, according to the invention, enables the above-mentioned objects to be achieved.

In particular, the interface module, according to the invention, allows an easy and effective exchange of information with one or more electronic or electromechanical devices of a medium voltage interruption unit.

As a consequence, simple programming or configuring procedures of said electronic or electromechanical devices can be easily executed.

In addition, identification information or configuration parameters can be immediately retrieved from said electronic or electromechanical devices.

All these features entail a remarkable reduction of the overall number of variants of said electronic or electromechanical devices, which are needed to cover the current market/installation requirements.

Further, all these features allows a considerable improvement of the assembly procedures of the interruption unit.

The interface module, according to the present invention, does not need powerful microcontrollers for its functioning and it can be realized at industrial level without any difficulties and at competitive cost.

The invention claimed is:

1. An interface module for communication with at least a first device of a medium voltage interruption unit, said first device comprising at least a power supply port, through which said first device receives electric power, the interface module comprising:
   a first interface electrically connected to said power supply port, said first interface exchanging information (I1, I2) with said first device through said power supply port;
   wherein the first interface transmits information (I1) to the first device by modulating a supply voltage provided to the first device through the power supply port; and
   wherein the first device transmits information (I2) to the first interface by modulating a current consumption of said first device through the definition of a sequence of supply current levels for the current consumed by said first device.

2. An interface module, according to claim 1, characterized in that said first interface comprises a power audio amplifier for modulating the supply voltage, which is supplied to said first device through said power supply port.

3. An interface module, according to claim 2, characterized in that said first device comprises a decoder for decoding the information (I1), which is transmitted by said first interface through said power supply port.

4. An interface module, according to claim 2, characterized in that said first device transmits information (I2) to said first interface by modulating the power supply current, which is supplied to said first device through said power supply port.

5. An interface module, according to claim 1, characterized in that said first device comprises a decoder configured to decode the information (I1), which is transmitted by said first interface through said power supply port.

6. An interface module, according to claim 5, characterized in that said first device transmits information (I2) to said first interface by modulating the power supply current, which is supplied to said first device through said power supply port.

7. An interface module, according to claim 1, characterized in that said first device transmits information (I2) to said first interface by modulating the power supply current, which is supplied to said first device through said power supply port.

8. An interface module, according to claim 7, characterized in that said first interface comprises a current sensor for measuring the power supply current, which is consumed by said first device.

9. An interface module, according to claim 7, characterized in that said first device comprises an encoder for encoding the information (I2) to be transmitted to said first interface.

10. An interface module, according to claim 1, characterized in that said first device comprises storage for storing the information (I1) received from said first interface and/or the information (I2) to be transmitted to said first interface.

11. An interface module, according to claim 1, characterized in that it comprises second interface for exchanging information (I1, I2) with at least a second device.

12. An interface module, according to claim 11, characterized in that it comprises a transceiver, which allows the exchange of information (I1, I2) between said first interface and said second interface.

13. An interface module, according to claim 11, characterized in that said second device is a computerized device for programming/configuring said first device.

14. An interface module, according to claim 1, characterized in that it is capable of executing a self learning procedure to measure the supply voltage and current values (Vp, Ip) that are supplied to the first device in normal conditions.

15. An interface module, according to claim 1, characterized in that said first device is an actuating device or a sensing device or a relay or a switch device or a locking device of said interruption unit.

16. An interface module, according to claim 1, characterized in that said medium voltage interruption unit is a medium voltage circuit breaker.

17. A medium voltage interruption unit characterized in that it comprises an interface module, according to claim 1.

18. An interface module, according to claim 1, characterized in that said first device transmits information (I2) to said first interface by modulating the power supply current, which is supplied to said first device through said power supply port.

* * * * *